United States Patent [19]

Krauss et al.

[11] 4,399,944

[45] Aug. 23, 1983

[54] ELECTROMAGNETIC FUEL INJECTION VALVE AND PROCESS TO MANUFACTURE AN ELECTROMAGNETIC FUEL INJECTION VALVE

[75] Inventors: Rudolf Krauss, Stuttgart; Rudolf Sauer, Benningen, both of Fed. Rep. of Germany

[73] Assignee: Robert Bosch GmbH, Stuttgart, Fed. Rep. of Germany

[21] Appl. No.: 285,679

[22] Filed: Jul. 21, 1981

[30] Foreign Application Priority Data

Aug. 21, 1980 [DE] Fed. Rep. of Germany ....... 3031564

[51] Int. Cl.³ .................... B05B 1/30; F02M 51/00
[52] U.S. Cl. .................... 239/585; 239/584; 239/600
[58] Field of Search ................ 239/584, 585, 600; 251/139, 141

[56] References Cited

U.S. PATENT DOCUMENTS 3,865,312 2/1975 Lombard ............................ 251/139
4,218,021 8/1980 Palma ................................ 239/585
4,311,280 1/1982 Knape ............................... 239/585

Primary Examiner—John J. Love
Assistant Examiner—Jon M. Rastello
Attorney, Agent, or Firm—Edwin E. Greigg

[57] ABSTRACT

An electromagnetic fuel injection valve and a process for the adjustment of the armature stroke (H) of the fuel injection valve is proposed, which serves to inject fuel under low pressure into the suction pipe of an internal combustion engine. The fuel injection valve surrounds an armature guided in a valve housing. This armature is tightly fastened to a movable valve section which cooperates with a fixed valve seat in a nozzle body supported in a nozzle carrier. The armature stroke can be adjusted in an assembled condition of the fuel injection valve by moving the nozzle body in an axial direction. For this the stroke ($H_{eff}$) is measured by an odometrical system (distance sensing system), in the assembled condition of the fuel injection valve while the electromagnetic system is excited and the fixed valve seat provided on the nozzle body is displaced with the aid of a pressing tool by the difference between the measured stroke ($H_{eff}$) and the desired armature stroke (H).

2 Claims, 2 Drawing Figures

ELECTROMAGNETIC FUEL INJECTION VALVE AND PROCESS TO MANUFACTURE AN ELECTROMAGNETIC FUEL INJECTION VALVE

BACKGROUND OF THE INVENTION

The invention is directed to an electromagnetic fuel injection valve having a valve section guided in a housing and actuated by an armature cooperating with a fixed valve seat. A fuel injection valve and a process to manufacture the fuel injection valve is already known in which the adjustment of the armature stroke takes place by underlaying spacers of varying thickness. Such a working operation prevents automation in the manufacturing operation, is expensive, and encompasses too large deviations in the ejection quantities of the individual fuel injection valve.

OBJECT AND SUMMARY OF THE INVENTION

It is a principal object of the invention to provide a fuel injection valve having the advantage that it is easy to manufacture, allows for an automation of the adjustment of the armature stroke, and maintains deviations between the injection quantities of individual fuel injection valves may be within very narrow limits.

As a result of the characteristics of the invention, advantageous modifications and improvements of the fuel injection valve as disclosed may be obtained.

The process according to the invention in its manufacture of a fuel injection valve has the advantage that the adjustment of the armature stroke may take place automated, is priced advantageously, and the equipment is constructed more precisely.

As a result of the advantageous modifications and improvements of the process of the invention, improved advantages may be obtained.

The invention will be better understood and further objects and advantages thereof will become more apparent from the ensuing detailed description of preferred embodiments taken in conjunction with the drawing.

DESCRIPTION OF THE PREFERRED EMBODIMENTS

Figure 1:
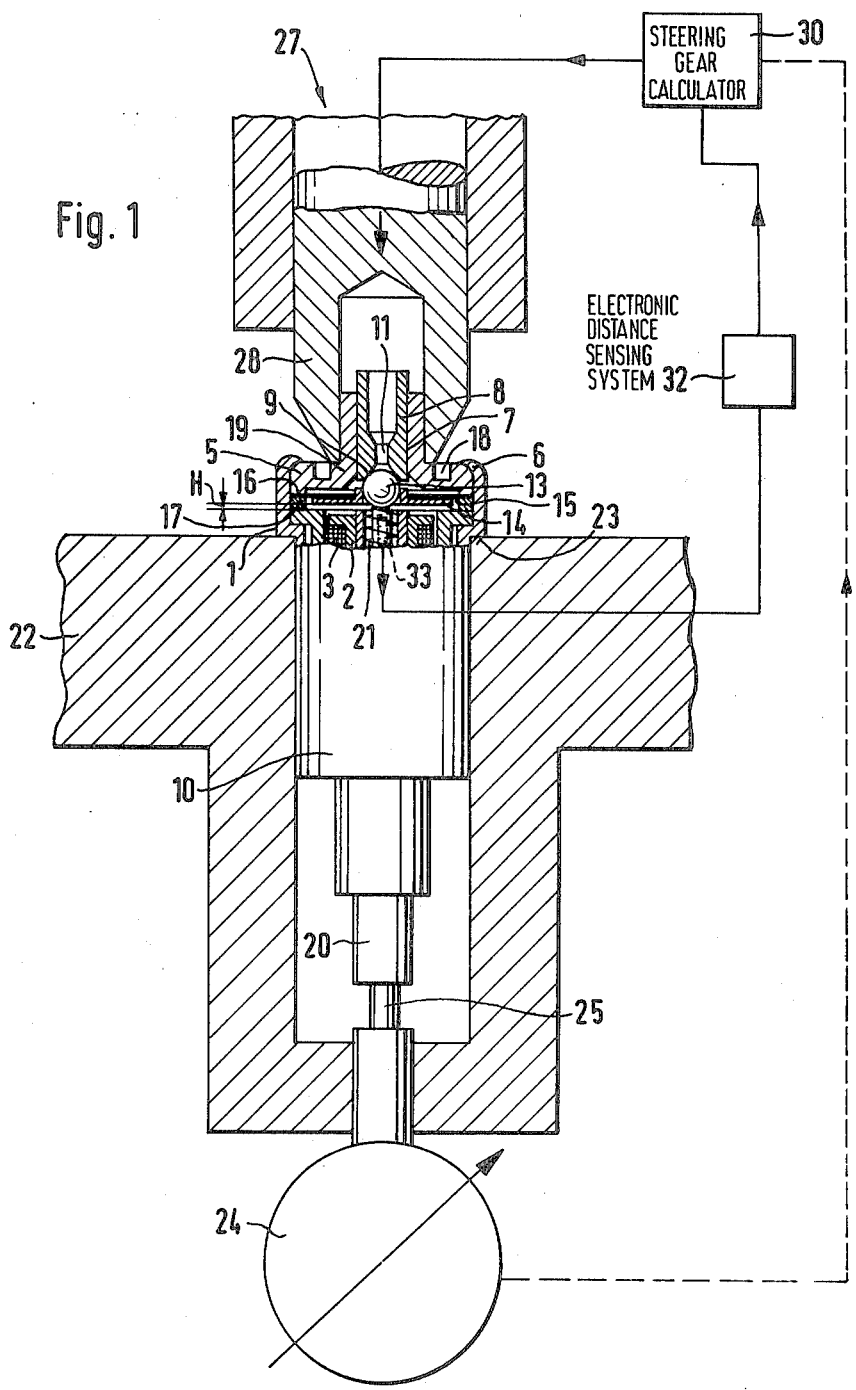
FIG. 1 shows a first exemplary embodiment of an apparatus to execute the process of adjusting the armature stroke of a fuel injection valve according to the invention.

The electromagnetic fuel injection valves for a fuel injection apparatus shown in the drawing serve to inject fuel, especially with low pressure, into the suction pipe of separately ignited internal combustion gas engines. In the fuel injection valve according to FIG. 1, a valve housing 1 is described in which a magnetic coil 3 is disposed on a spool carrier 2. A nozzle carrier 5 is inserted into the valve housing 1 and is tightly held by a flange 6. A nozzle body 8 is pressed into a central holding bore 7 of the nozzle carrier 5, in which a fixed valve seat 9 is developed via which fuel, in an excited condition of the fuel injection valve 10, reaches a metering nozzle hole 11 and from there can reach the vacuum pipe of the internal combustion engine. A movable valve section 13 constructed in the form of a ball cooperates with the fixed valve seat 9, said valve section being fastened to a flat armature 14 which is held movable in an axial direction by a guide membrane 15 counter to the force of a restoring spring 21. The guide membrane 15 abuts an annular protrusion 16 of the nozzle carrier 5 in its outer area and is clamped in, on the other side, by a stroke ring 17 which braces solidly on the housing due to the pressure resulting from the flange 6. With a smaller diameter than the flange 6, the nozzle carrier 5 has an annular groove 18 which lessens the thickness of the nozzle carrier 5 in an axial direction. This annular groove 18 separates an outer area of the nozzle carrier 5 at which the flange 6 engages from an inner area 19 of the nozzle carrier 5.

A fuel connection pipe 20 is provided on the end of the fuel injection valve 10 remote from the nozzle carrier 5.

A defined armature stroke H must be created in electromagnetic fuel injection valves with repeatable switching times. Therefore, a comparison ring of known thickness is initially inserted into known fuel injection valves to adjust the armature stroke H; and by measuring the then resulting stroke $H_{eff}$, the thickness of the stroke ring that is finally to be inserted is determined. The comparison ring is then exchanged with the final stroke ring and the fuel injection valve is rigidly mounted. This procedure is not only not accessible to an automation of the adjustment of the armature stroke H but also contains the danger that a change in stroke may take place during the flanging process, which makes the completed fuel injection valve to be a defective part. Thus one must look for a solution of substituting such a time consuming manual procedure, which contains many individual possibilities for mistakes, with a suitable procedure.

Figure 2:
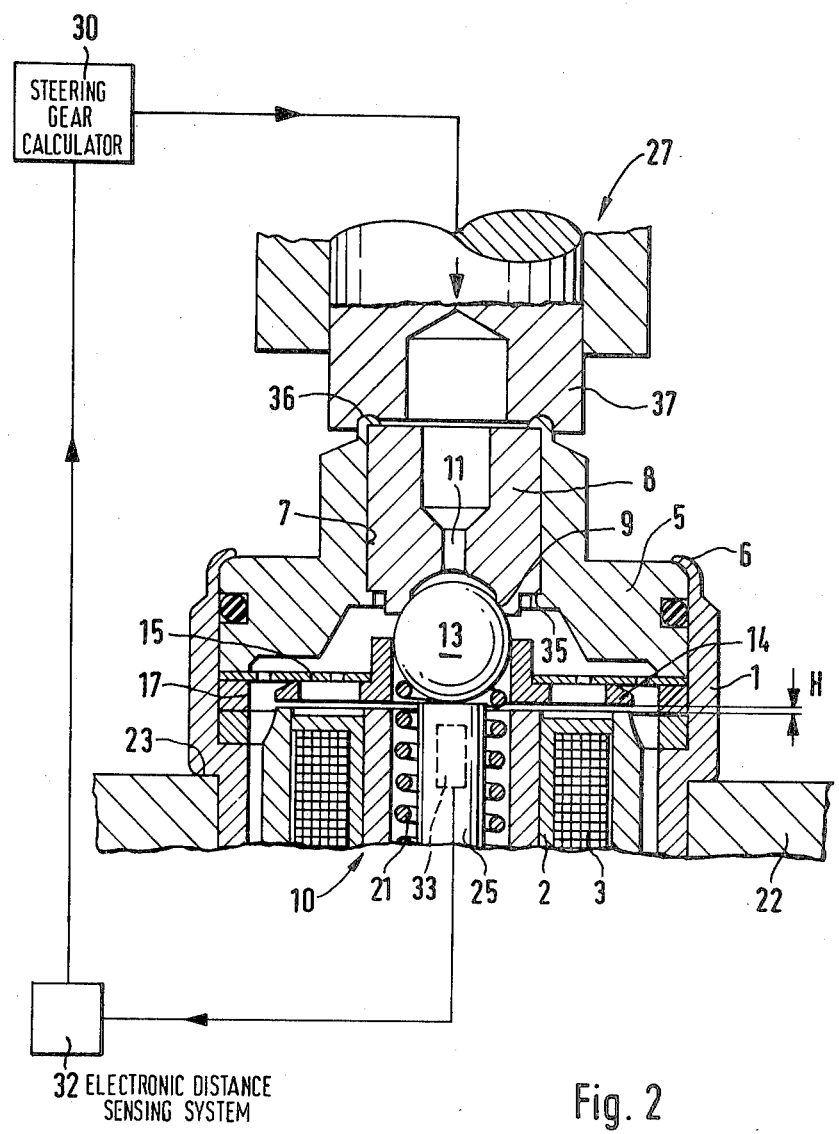
FIG. 2 shows a second exemplary embodiment of an apparatus to execute the process of adjusting the armature stroke of a fuel injection valve according to the invention.

With the aid of FIGS. 1 and 2, new processes are described which enable an automation of the adjustment of the armature stroke H in the rigidly mounted fuel injection valve, especially of the described design. In the first process of adjusting the armature stroke H according to FIG. 1, the fuel injection valve 10 is mounted in such a manner that a stroke $H_{eff}$ of the flat armature 14 results which is even larger than the desired armature stroke H and is inserted into a tool carrier 22 which it abuts with a step 23. A mechanical odometrical system (distance sensing system) 24 can be arranged in the tool carrier 22 as well, the tracer point 25 of which is inserted into the interior of the fuel injection valve via the fuel connection pipe 20 and, for example, abuts the ball 13. A dial gauge, for example, can serve as a mechanical odometrical system (distance sensing system) 24. If the electromagnetic system 3, 14 of the fuel injection valve 10 is now excited, then the mechanical odometrical system (distance sensing system) 24 indicates which stroke $H_{eff}$ the flat armature 14 executes. With the help of a known appropriate power press 27 a pressing tool 29, that engages in the inner area 19 of the nozzle carrier 5, can now be controlled in such a way that it bends the nozzle carrier 5 weakened by the annular groove 18 in its inner area 19 by the difference between the measured stroke $H_{eff}$ and the desired armature stroke H in the direction of the flat armature 14. Thereby the fixed valve seat 9 moves towards the ball 13 by the same amount, as well. The data indicated on the mechanical odometrical system (distance sensing system) can thereby be fed into an electronic steering gear 30, as shown in dotted line, through which the power press 27 may be controlled. The stroke $H_{eff}$ of the flat armature 14 may, for example, also be measured by an electronic odometrical system (distance sensing system) 32 with the aid of a probe 33 provided near the flat armature 14, as shown in a dotted line, and be fed into the electronic steering gear (calculator) 30. In a further working operation the power press 27 is controlled by the electronic steering gear (calculator) 30 in such a manner, that the pressing tool 28 displaces the inner area 19 of the nozzle carrier 5 by the difference between the measured stroke $H_{eff}$ of the flat armature 14 and the desired armature stroke H.

In the preferred embodiment according to FIG. 2 the same reference symbols were used for identical parts and parts with identical function. The nozzle carrier 5 of the fuel injection valve 10 according to FIG. 2 does not have an annular groove as in the fuel injection valve 10 according to FIG. 1. During the assembly of the fuel injection valve the nozzle body 8 of the fuel injection valve 10 is pushed so far into the holding bore 7 of the nozzle carrier 5 by a flanging tool until it abuts a protruding shoulder 35. Thereby the flanging tool bends the nozzle carrier 5 on the end remote from the shoulder 35 over the nozzle body 8 at this end forming a flange edge 36. The shoulder 35 is provided on the end of the holding bore 7 turned toward the flat armature 14 and executed in such a way that the nozzle body 8, so as to adjust the armature stroke H, may be displaced further in the direction of the ball 13 serving as a movable valve section with the aid of a pressing tool while bending the shoulder 35. A stroke $H_{eff}$ of the flat armature 14 is supposed to result at the nozzle body 8 abutting the shoulder 35 which is larger than the desired armature stroke H. To adjust the armature stroke H the fuel injection valve is inserted into the tool carrier 22, as has already been described to FIG. 1, and the stroke $H_{eff}$ of the flat armature 14 is measured by the odometrical system (distance sensing system) 24, 25, or 32 while the electromagnetic system 3 is excited. Based on results of these measurements, a power press 27 is steered in through the intermediary of an electronic steering gear (calculator) 30. This power press 27 engages the flange edge 36 of the fuel injection valve 10 with a pressing tool 37 causing a flange and while bending the shoulder 35 displaces the nozzle body 8 so far in the direction towards the movable valve section 13 until the desired armature stroke H results.

In the FIGS. 1 and 2 fuel injection valves 10 are shown which permit an adjustment of the armature stroke H with the aid of the also shown apparatus in the completely assembled fuel injection valves.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electromagnetic fuel injection valve comprising:
    a movable valve section guided in a valve housing actuable via an armature,
    a fixed valve seat cooperating with said valve section and embodied on a nozzle body supported in a nozzle carrier,
    said nozzle carrier has an annular groove which weakens the thickness of the nozzle carrier in an axial direction in such a manner that an inner area of the nozzle carrier is deformed in an axial direction in an assembled condition of the fuel injection valve, and
    the nozzle body is movable in an axial direction for adjustment of the armature stroke (H) in an assembled condition of the fuel injection valve.

2. An electromagnetic fuel injection valve comprising:
    a movable valve section guided in a valve housing actuable via an armature,
    a fixed valve seat cooperating with said valve section and embodied on a nozzle body support in a nozzle carrier,
    said nozzle carrier includes a holding bore with a shoulder, a lower end of said nozzle body abuts said shoulder of said holding bore of said nozzle carrier, said shoulder facing towards the movable valve section and an upper end of said nozzle body is supported by a flanged edge of the nozzle carrier and the shoulder has a thickness such that it is bendable in an axial direction by displacement of the nozzle body for adjustment of the armature stroke (H) in an assembled condition of the fuel injection valve.

* * * * *